United States Patent
Ichioka

(10) Patent No.: US 10,421,290 B2
(45) Date of Patent: Sep. 24, 2019

(54) INKJET PRINTING APPARATUS AND VARIABLE-DENSITY CORRECTION METHOD

(71) Applicant: SCREEN HOLDINGS CO., LTD., Kyoto (JP)

(72) Inventor: Yoshikazu Ichioka, Kyoto (JP)

(73) Assignee: SCREEN HOLDINGS CO., LTD., Kyoto (JP)

(\*) Notice: Subject to any disclaimer, the term of this patent is extended or adjusted under 35 U.S.C. 154(b) by 0 days.

(21) Appl. No.: 16/107,499

(22) Filed: Aug. 21, 2018

(65) Prior Publication Data
US 2019/0092039 A1 Mar. 28, 2019

(30) Foreign Application Priority Data
Sep. 25, 2017 (JP) .................. 2017-183434

(51) Int. Cl.
*B41J 2/21* (2006.01)
*H04N 1/401* (2006.01)
(Continued)

(52) U.S. Cl.
CPC ......... *B41J 2/2139* (2013.01); *B41J 2/04508* (2013.01); *B41J 2/04535* (2013.01); *B41J 29/393* (2013.01); *G06K 15/102* (2013.01); *G06T 7/001* (2013.01); *H04N 1/1074* (2013.01); *H04N 1/4015* (2013.01); *B41J 2029/3935* (2013.01); *G06T 2207/30144* (2013.01)

(58) Field of Classification Search
CPC ...... B41J 29/393; B41J 2/2139; B41J 2/2132; B41J 2/04508; B41J 2/04535; B41J 2/04501; B41J 2029/3935; G06K 15/102; G06T 7/001; G06T 2207/30144; H04N 1/1074; H04N 1/4015
USPC ..................................................... 347/14, 19
See application file for complete search history.

(56) References Cited

U.S. PATENT DOCUMENTS

| 6,278,101 B1 | 8/2001 | Puyot |
| 2004/0141209 A1 | 7/2004 | Marumoto et al. |

(Continued)

FOREIGN PATENT DOCUMENTS

| JP | 06-164849 A | 6/1994 |
| JP | 2016-210050 A | 12/2016 |

OTHER PUBLICATIONS

Extended European Search Report issued in corresponding European Patent Application No. 18189268.8-1209, dated Jan. 31, 2019.

*Primary Examiner* — Jannelle M Lebron
(74) *Attorney, Agent, or Firm* — McDermott Will & Emery LLP

(57) ABSTRACT

First, shading charts are printed on a surface of a recording medium. Then, a plurality of captured images is acquired for a region of the same density of the shading charts printed on the recording medium. At this time, the amounts of displacement in the position of the recording medium in the main scanning direction, which is the direction of arrangement of nozzles, are also detected. Then, one super-resolution image with a higher resolution than the captured images is generated on the basis of the captured images and the amounts of displacement in the position of the recording medium in the main scanning direction. Thereafter, a variable-density correction amount is calculated for each of the nozzles on the basis of the generated super-resolution image.

13 Claims, 10 Drawing Sheets

(51) Int. Cl.
*B41J 2/045* (2006.01)
*B41J 29/393* (2006.01)
*G06K 15/10* (2006.01)
*G06T 7/00* (2017.01)
*H04N 1/107* (2006.01)

(56) References Cited

U.S. PATENT DOCUMENTS

| | | | |
|---|---|---|---|
| 2013/0169709 A1* | 7/2013 | Takeda | B41J 2/2146 347/14 |
| 2014/0313552 A1 | 10/2014 | Yoshizawa | |
| 2018/0272775 A1* | 9/2018 | Muramatsu | B41J 29/393 |

* cited by examiner

INKJET PRINTING APPARATUS AND VARIABLE-DENSITY CORRECTION METHOD

RELATED APPLICATIONS

This application claims the benefit of Japanese Application No. 2017-183434, filed on Sep. 25, 2017, the disclosure of which is incorporated by reference herein.

BACKGROUND OF THE INVENTION

Field of the Invention

The present invention relates to an inkjet printing apparatus for printing an image on a surface of a recording medium and a variable-density correction method for inkjet printing apparatuses.

Description of the Background Art

Inkjet printing apparatuses for recording an image on a long band-like recording medium by ejecting ink from their heads while transporting the recording medium have conventionally been known. The heads of the inkjet printing apparatuses have a plurality of nozzles. Each nozzle ejects an amount of ink that corresponds to the density designated by input image data. However, the amount of ink ejected from each nozzle varies slightly due to individual differences in the nozzles.

This type of inkjet printing apparatus performs shading correction in order to reduce inconsistences in density caused by individual differences in the nozzles. When shading correction is performed, first, predetermined shading charts are printed on a recording medium. Thereafter, images of the printed shading charts are captured by a camera. Then, a difference in the amount of ink ejected from each nozzle is determined on the basis of the acquired captured images so as to correct the amount of ink to be ejected from each nozzle.

For example, Japanese Patent Application Laid-Open No. 2016-210050 discloses a technique for correcting the ejection characteristics of each recording device in an inkjet printing apparatus.

In recent years, the recording resolutions of heads of inkjet printing apparatuses have become higher with increasing resolution of printed matter. That is, the interval between each of a plurality of nozzles of the heads has become narrower. Thus, a high-resolution camera is necessary to determine a difference in the amount of ink ejected from each nozzle through the aforementioned shading correction. However, use of a high-resolution camera significantly increases the manufacturing cost of inkjet printing apparatuses.

SUMMARY OF THE INVENTION

It is an object of the present invention to provide a technique for calculating a variable-density correction amount for each nozzle with use of an image capturing part with a lower resolution than the density of arrangement of nozzles of heads.

The present invention is directed to an inkjet printing apparatus for printing an image on a surface of a recording medium. The inkjet printing apparatus includes a head having a plurality of nozzles arranged in a main scanning direction, the plurality of nozzles ejecting ink to a surface of a recording medium, a transport mechanism that transports a recording medium relative to the head in a sub-scanning direction orthogonal to the main scanning direction, an image capturing part that captures an image of a surface of a recording medium at an image capturing position located downstream of the head in the sub-scanning direction, a detector that detects an amount of displacement in position of a recording medium in the main scanning direction at the image capturing position, and a controller connected to the head, the transport mechanism, the image capturing part, and the detector. The controller includes a chart print instruction part that controls and causes the head and the transport mechanism to print a shading chart whose density changes in a stepwise fashion in the sub-scanning direction on a recording medium, an image acquisition part that controls and causes the image capturing part to acquire a plurality of captured images for a region of the same density of the shading chart, an ultra-resolution processing part that generates one super-resolution image with a higher resolution than the plurality of captured images on the basis of the plurality of captured images acquired by the image capturing part and amounts of displacement in position of a recording medium in the main scanning direction, acquired by the detector, and a correction amount calculation part that calculates a variable-density correction amount for each of the plurality of nozzles on the basis of the ultra-resolution image.

The present invention is also directed to a variable-density correction method for an inkjet printing apparatus for printing an image on a surface of a recording medium by ejecting ink from a plurality of nozzles of a head arranged in a main scanning direction while transporting the recording medium relative to the head in a sub-scanning direction orthogonal to the main scanning direction. The variable-density correction method includes a) printing a shading chart whose density changes in a stepwise fashion in the sub-scanning direction, on a surface of a recording medium, b) acquiring a plurality of captured images for a region of the same density of the shading chart printed on a recording medium while detecting amounts of displacement in position of the recording medium in the main scanning direction, c) generating one super-resolution image with a higher resolution than the plurality of captured images acquired in the operation b), on the basis of the plurality of captured images and amounts of displacement in position of the recording medium in the main scanning direction, and d) calculating a variable-density correction amount for each of the plurality of nozzles on the basis of the super-resolution image.

According to the present invention, a plurality of captured images are converted into a single super-resolution image of a high resolution, and the variable-density correction amount for each nozzle is calculated on the basis of the super-resolution image. Thus, the variable-density correction amount for each nozzle can be calculated using the image capturing part with a lower resolution than the density of arrangement of the nozzles.

These and other objects, features, aspects and advantages of the present invention will become more apparent from the following detailed description of the present invention when taken in conjunction with the accompanying drawings.

DESCRIPTION OF PREFERRED EMBODIMENTS

Embodiments of the present invention will be described hereinafter with reference to the drawings. In the following description, the direction in which a recording medium moves relative to heads is referred to as a "sub-scanning direction." Also, the direction along a surface of the recording medium and orthogonal to the sub-scanning direction is referred to as a "main scanning direction."

1. Configuration of Inkjet Printing Apparatus

Figure 1:
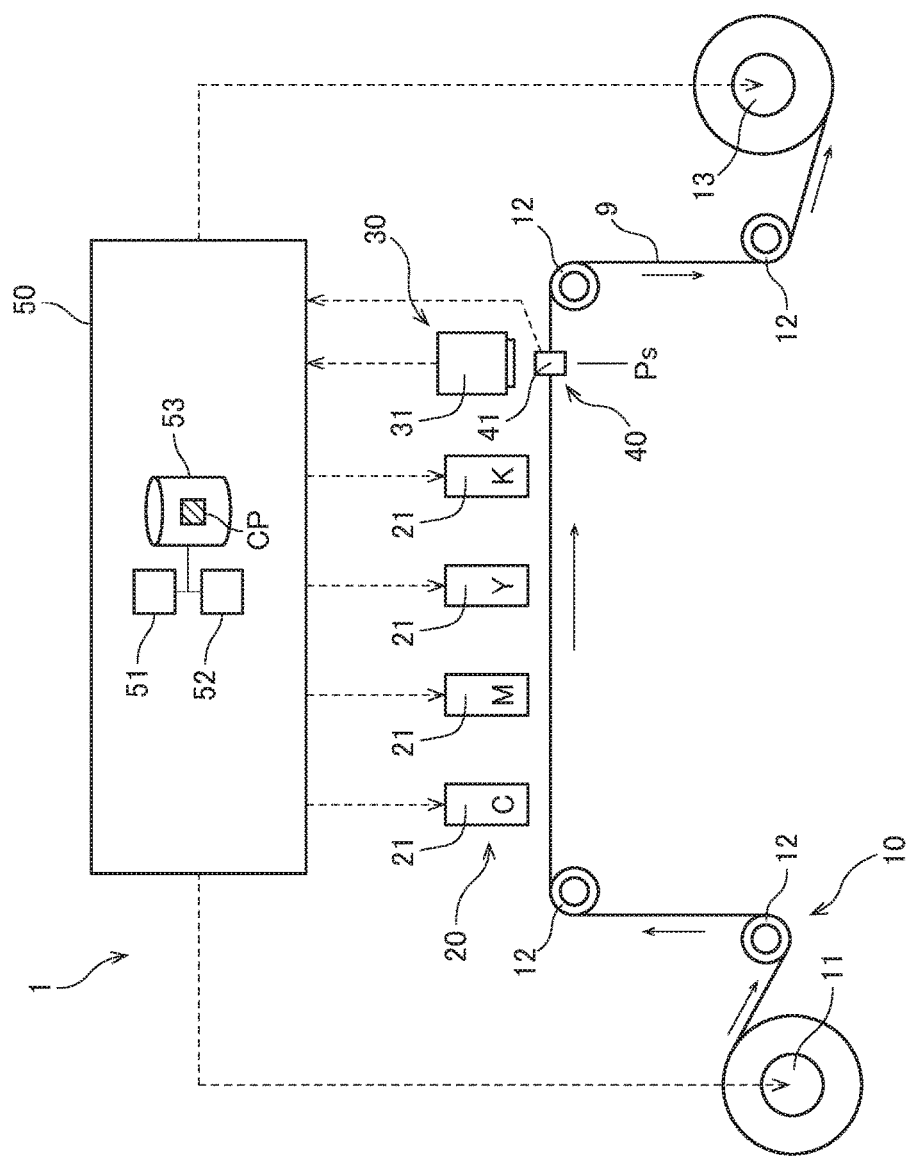
FIG. 1 illustrates a configuration of an inkjet printing apparatus.

FIG. 1 illustrates a configuration of an inkjet printing apparatus 1 according to an embodiment of the invention. The inkjet printing apparatus 1 is an apparatus that prints a multicolor image on a record surface of printing paper 9, which is a long band-like recording medium, by ejecting ink from a plurality of heads 21 toward the printing paper 9 while transporting the printing paper 9. As illustrated in FIG. 1, the inkjet printing apparatus 1 includes a transport mechanism 10, an image recording part 20, an image capturing part 30, a detector 40, and a controller 50.

The transport mechanism 10 is a mechanism for transporting the printing paper 9 in the sub-scanning direction, which is the longitudinal direction of the printing paper 9. The transport mechanism 10 according to the present embodiment includes an unwinder 11, a plurality of transport rollers 12, and a winder 13. The printing paper 9 is unwound from the unwinder 11 and transported along a transport path configured by the plurality of transport rollers 12. Each transport roller 12 rotates about a horizontal axis so as to guide the printing paper 9 downstream of the transport path. The transported printing paper 9 is collected by the winder 13.

As illustrated in FIG. 1, the printing paper 9 moves approximately horizontally in the direction of arrangement of the plurality of heads 21 under the image recording part 20. At this time, the record surface of the printing paper 9 faces upward (faces the heads 21). Also, the printing paper 9 runs over the plurality of transport rollers 12 under tension. This configuration suppresses, for example, the occurrence of slack and creases in the printing paper 9 during transport.

The image recording part 20 is a processing part that ejects droplets of ink (hereinafter, referred to as "ink droplets") to the printing paper 9 that is being transported by the transport mechanism 10. The image recording part 20 according to the present embodiment includes four heads 21 aligned in the sub-scanning direction. These heads 21 respectively eject ink droplets of colors of cyan (C), magenta (M), yellow (Y), and black (K), which serve as color components of a multicolor image, to the record surface of the printing paper 9. Each head 21 is fixedly disposed on a housing (not shown) of the apparatus.

Figure 2:
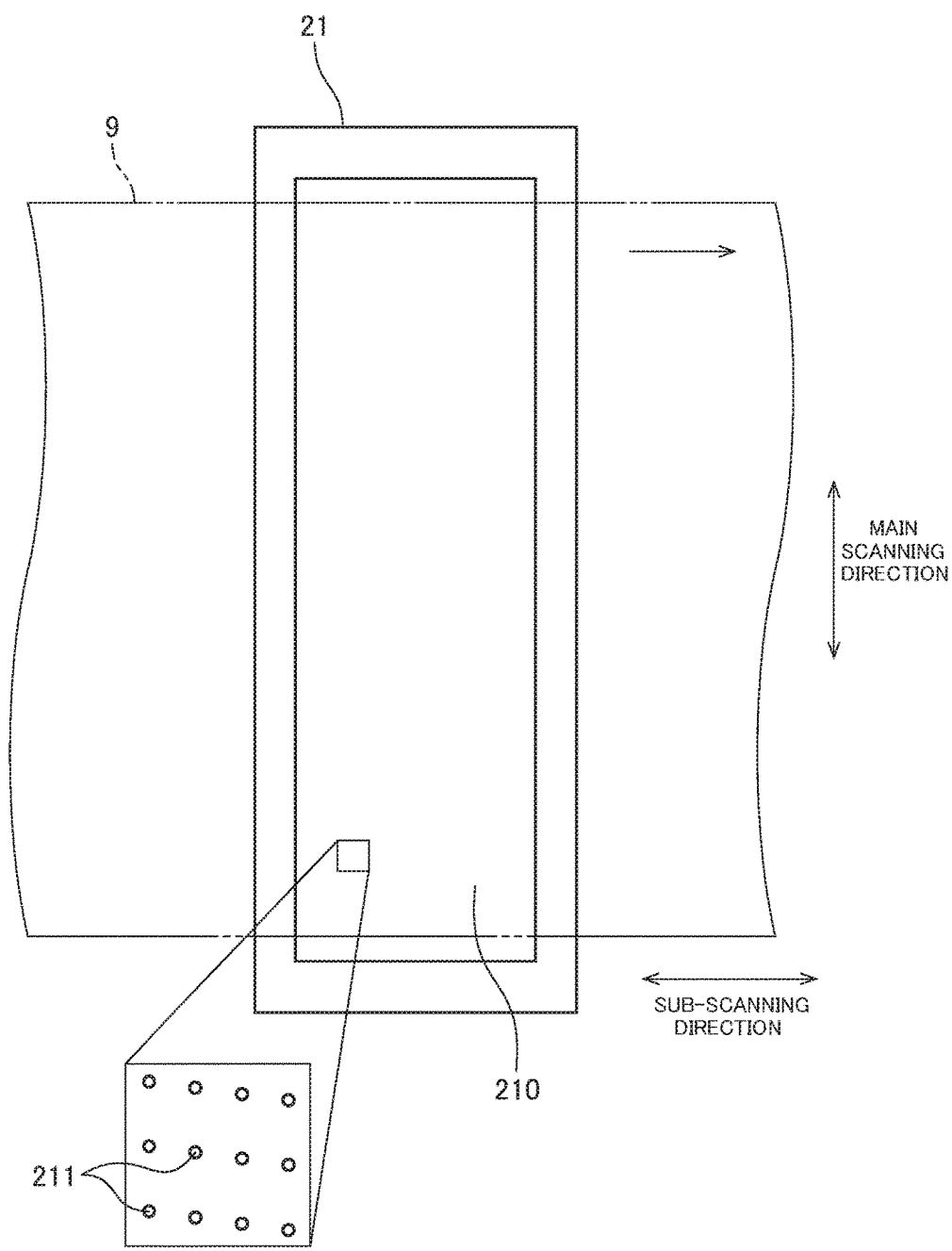
FIG. 2 is a bottom view of one head.

FIG. 2 is a bottom view of one head 21. As illustrated in FIG. 2, the bottom of the head 21 has an ejection face 210 from which ink droplets are ejected. The ejection face 210 covers the entire width of the printing paper 9 in the main scanning direction. As illustrated in an enlarged scale in FIG. 2, the ejection face 210 has a plurality of nozzles 211 arranged regularly. The plurality of nozzles 211 are staggered in relation to one another in the main scanning direction, and one nozzle 211 is assigned to one pixel-wide region on the printing paper 9. In the case of printing, ink droplets are ejected from the plurality of nozzles 211 of each head 21 toward the record surface of the printing paper 9. At this time, each nozzle 211 ejects an amount of ink droplets that corresponds to the designated density. As a result, the four heads 21 each record a multitone single-color image on the record surface of the printing paper 9. Then, the four single-color images are overlaid one on another so as to form a multicolor image on the record surface of the printing paper 9.

Note that a dry processing part for drying the ink ejected to the record surface of the printing paper 9 may additionally be provided downstream of the image recording part 20 in the transport direction. The dry processing part dries ink by, for example, blowing a heated gas toward the printing paper 9 and vaporizing a solvent in the ink adhering to the printing paper 9. Alternatively, ink may be fixed on a base material by methods other than that described above, such as ultraviolet irradiation of ultraviolet (UV) curing ink.

The image capturing part 30 captures an image of the record surface of the printing paper 9 at an image capturing position Ps located downstream of the image recording part 20 in the sub-scanning direction. The image capturing part 30 uses a camera 31 that includes image sensors such as CCDs or MOSs. The camera 31 captures an image of the entire width of the record surface of the printing paper 9 in the main scanning direction. In this way, an image printed on the record surface of the printing paper 9 is acquired as multitone digital data. It is, however, noted that the image capture resolution of the camera 31 in the main scanning direction is lower than the recording resolution of the aforementioned heads 21 in the main scanning direction (i.e., the density of arrangement of the nozzles 211 in the main scanning direction).

The detector 40 detects the amount of displacement in the position of the printing paper 9 in the main scanning direction at the image capturing position Ps of the image capturing part 30. The detector 40 according to the present embodiment is configured by an edge sensor 41.

Figure 3:
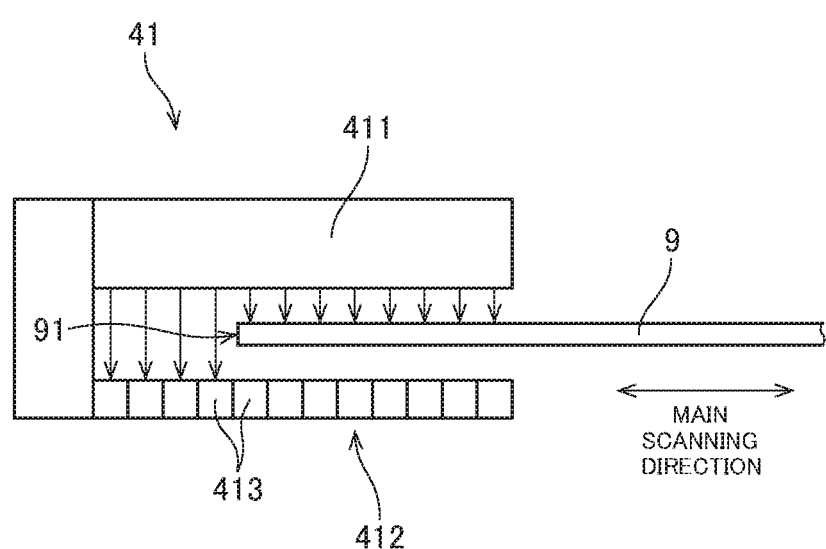
FIG. 3 schematically illustrates the structure of an edge sensor.

FIG. 3 schematically illustrates the structure of the edge sensor 41. As illustrated in FIG. 3, the edge sensor 41 includes a projector 411 located above an edge 91 of the printing paper 9, and a line sensor 412 located below the edge 91. The projector 411 emits parallel light downward. The line sensor 412 includes a plurality of light receiving elements 413 aligned in the main scanning direction. Outside the edge 91 of the printing paper 9, light emitted from the projector 411 enters and is detected by light receiving elements 413 as illustrated in FIG. 3. Inside the edge 91 of the printing paper 9, on the other hand, light emitted from the projector 411 is blocked by the printing paper 9 and is thus not detected by light receiving elements 413. The edge sensor 41 acquires a detection signal that indicates the amount of displacement in the position of the printing paper 9 in the main scanning direction, on the basis of whether light is detected by the plurality of light receiving elements 413. Then, the obtained detection signal is output to the controller 50.

The controller 50 is means for controlling and causing each constituent element in the inkjet printing apparatus 1 to operate appropriately. The controller 50 according to the present embodiment is configured by a computer that includes a processor 51 such as a CPU, a memory 52 such as a RAM, and a storage 53 such as a hard disk drive. As indicated by broken lines in FIG. 1, the controller 50 is electrically connected to each of the transport mechanism 10, the four heads 21, the image capturing part 30, and the detector 40, which are described above. The controller 50 controls and causes each constituent element described above to operate appropriately by temporarily reading out a computer program CP stored in the storage 53 into the memory 52 and causing the processor 51 to perform arithmetic processing in accordance with the computer program CP. Accordingly, print processing and shading correction processing, which will be described later, proceed in the inkjet printing apparatus 1.

2. Shading Correction

Next, shading correction performed by the above-described inkjet printing apparatus 1 will be described. The shading correction is processing (variable-density correction processing) for adjusting the amount of ink droplets to be ejected from each nozzle 211 of the heads 21 to an appropriate amount corresponding to the designated density. When the shading correction is performed, predetermined shading charts 8 are printed on the printing paper 9. Then, the amount of ink droplets to be ejected from each nozzle 211 is adjusted on the basis of the printing results of the shading charts 8.

Figure 4:
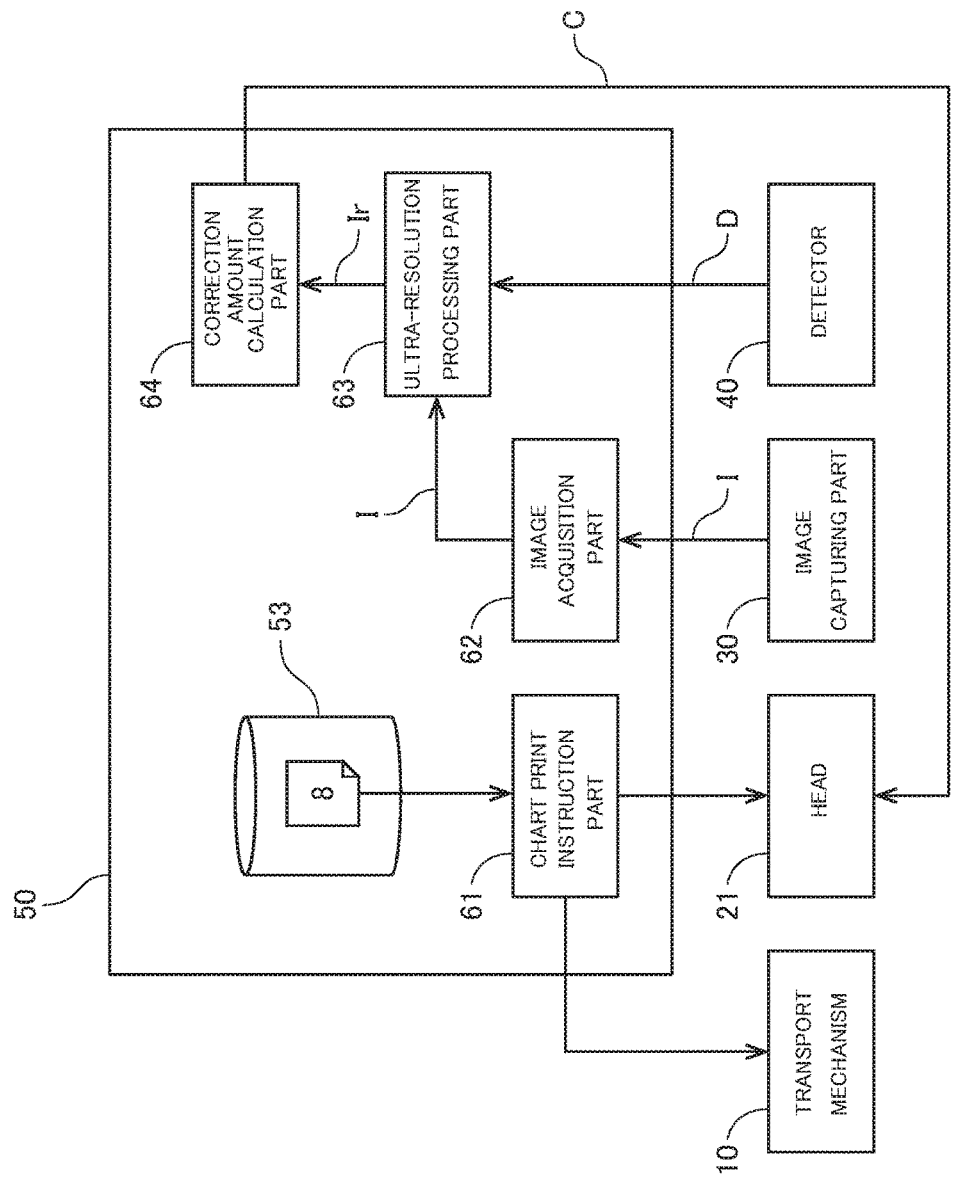
FIG. 4 is a block diagram schematically illustrating functions of a controller for implementing shading correction.

FIG. 4 is a block diagram schematically illustrating the functions of the controller 50 for implementing the shading correction. As illustrated in FIG. 4, the controller 50 includes a chart print instruction part 61, an image acquisition part 62, an ultra-resolution processing part 63, and a correction amount calculation part 64. The functions of these parts are implemented by the controller 50 operating in accordance with the computer program CP.

Figure 5:
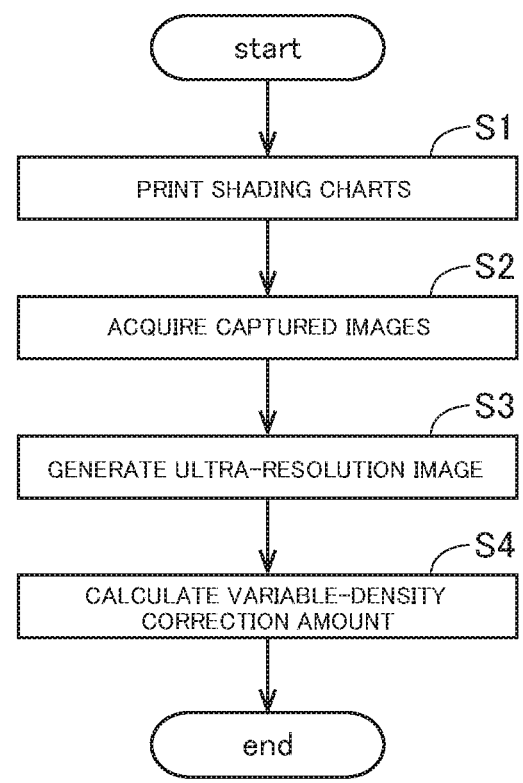
FIG. 5 is a flowchart illustrating a flow of shading correction.

FIG. 5 is a flowchart illustrating a flow of shading correction.

Figure 6:
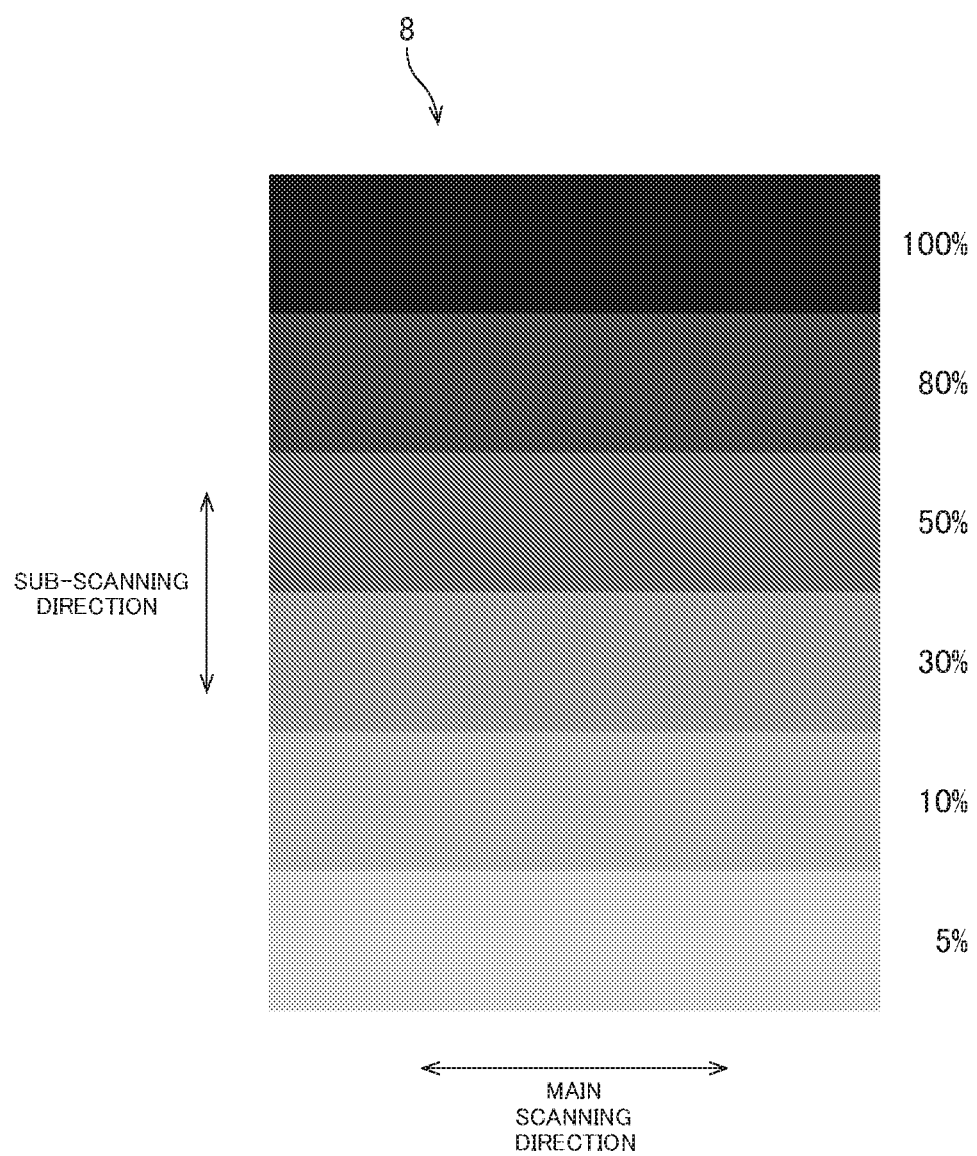
FIG. 6 illustrates one example of shading charts.

As illustrated in FIG. 5, when shading correction is performed, first, the shading charts 8 are printed on the record surface of the printing paper 9 (step S1). The shading charts 8 are test images for shading correction. FIG. 6 illustrates one example of the shading charts 8. As illustrated in FIG. 6, the shading charts 8 are images whose densities change in a stepwise fashion in the sub-scanning direction.

The storage 53 of the controller 50 stores data on the shading charts 8 in advance. In step S1, the chart print instruction part 61 controls and causes the transport mechanism 10 and the heads 21 to operate appropriately in accordance with the data on the shading charts 8 read out from the storage 53. At this time, each head 21 ejects the amounts of ink droplets that correspond to the densities of the shading chart 8 from all of the nozzles 211 in the main scanning direction. As a result, the shading chart 8 as illustrated in FIG. 6 is printed on the record surface of the printing paper 9.

In step S1, each of the four heads 21 prints such a shading chart 8. Accordingly, a shading chart 8 for C, a shading chart 8 for M, a. shading chart 8 for Y, and a shading chart 8 for K are individually printed on the record surface of the printing paper 9.

Next, image capture of the shading charts 8 printed on the record surface of the printing paper 9 is carried out. Specifically, the image acquisition part 62 controls and causes the image capturing part 30 to capture images with the camera 31. The camera 31 captures images of the record surface of the printing paper 9 at fixed intervals at the image capturing position Ps in the sub-scanning direction. Accordingly, a plurality of captured images I are acquired for a region of the same density of the shading chart 8 (step S2). Then, the acquired captured images I are output from the image capturing part 30 and input to the image acquisition part 62.

In step S2, in synchronization with the image capture with the camera 31, the detector 40 detects the amount of displacement (displacement amount) D in the position of the printing paper 9 in the main scanning direction. Specifically, the edge sensor 41 acquires the amounts of displacement D in the position of the printing paper 9 in the main scanning direction at the image capturing position Ps in the sub-scanning direction at the time when images are captured with the camera 31. Then, a detection signal that indicates the amount of displacement D in position is output from the edge sensor 41 and input to the controller 50.

While the printing paper 9 is being transported by the transport mechanism 10, the position of the printing paper 9 in the main scanning direction slightly changes due to the occurrence of unavoidable meandering or skew. In many cases, the amount of displacement D in position is within the range of approximately one to several nozzles 211 in the main scanning direction. The edge sensor 41 detects this amount of displacement D in the position of the printing paper 9 in the main scanning direction.

Figure 7:
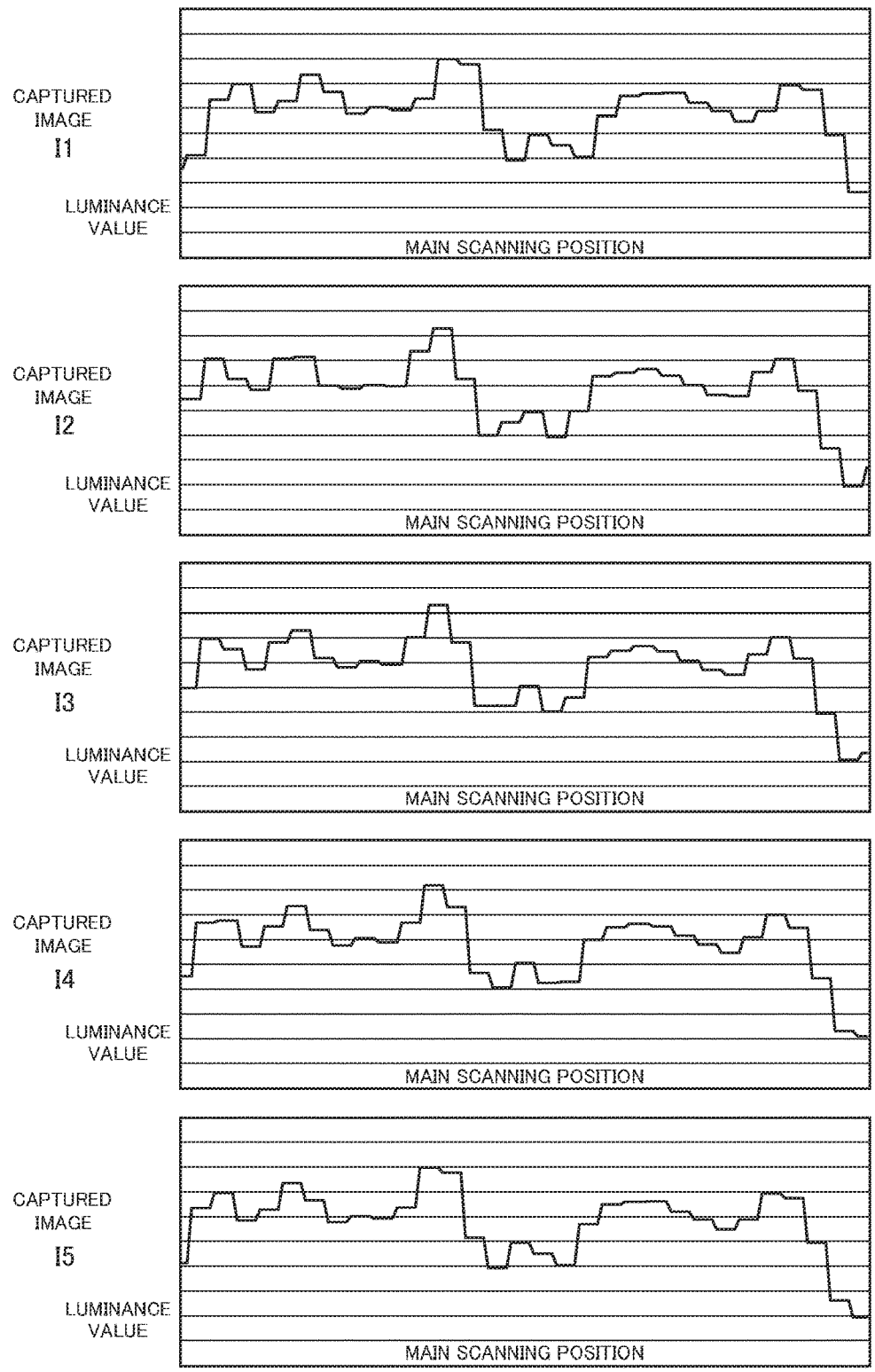
FIG. 7 illustrates examples of luminance distributions of five captured images in a main scanning direction.

In the following description, multiple captured images acquired for a region of the same density of the shading charts 8 are referred to as captured images In, where n is a natural number. FIG. 7 illustrates examples of luminance distributions of five captured images I1 to I5 in the main scanning direction. The resolutions of the captured images I1 to I5 in the main scanning direction are image capture resolutions corresponding to the specifications of the camera 31. These image capture resolutions are lower than the recording resolutions of the heads 21 in the main scanning direction.

The ultra-resolution processing part 63 of the controller 50 generates a super-resolution image Ir with a higher resolution than the captured images I1 to I5 on the basis of the captured images I1 to I5 acquired by the image acquisition part 62 and the amounts of displacement D in position corresponding to the captured images I1 to I5 (step S3). Specifically, each of the captured images I1 to I5 is shifted in the main scanning direction in accordance with the amounts of displacement D in the position of the printing paper 9 in the main scanning direction, obtained when the captured image In is acquired. In this way, the positions of the shading charts 8 in the main scanning direction in the captured images I1 to I5 are aligned. Then, the shifted captured images I1 to I5 are composited. For example, an average value of the luminance values of the shifted captured images I1 to I5 is acquired at each main scanning position. This average value of the luminance values is calculated for each main scanning position where there is a nozzle 211.

Figure 8:
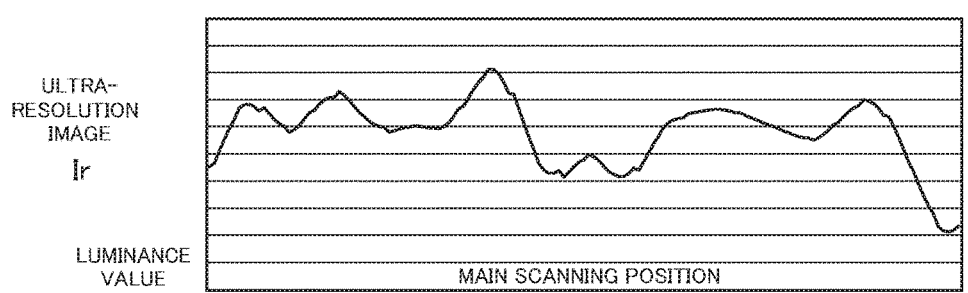
FIG. 8 illustrates an example of a luminance distribution of a super-resolution image in the main scanning direction.

FIG. 8 illustrates a luminance distribution of the super-resolution image Ir in the main scanning direction, obtained by subjecting the five captured images I1 to I5 in FIG. 7 to ultra-resolution processing. As illustrated in FIG. 8, the super-resolution image Ir has a higher resolution in the main scanning direction than the captured images I1 to I5. Thus, at the main scanning positions corresponding to each nozzle 211, the luminance values in the printed shading charts 8 can be known with high accuracy.

Thereafter, the correction amount calculation part 64 of the controller 50 references the super-resolution image Ir and compares the luminance value at each main scanning position corresponding to the nozzles 211 in the super-resolution image Ir with an ideal luminance value. Then, the correction amount calculation part 64 calculates a variable-density correction amount C for each nozzle 211 on the basis of the comparison result (step S4). The variable-density correction amount C is a parameter for use in correcting the amount of ink droplets to be ejected from each nozzle 211 in accordance with the designated density value. For example, if the luminance value at the position corresponding to one nozzle 211 in the super-resolution image Ir is smaller than the ideal luminance value (target luminance value), the variable-density correction amount C is calculated so as to reduce the amount of ink to be ejected from that nozzle 221. If the luminance value at the position corresponding to one nozzle 211 in the super-resolution image Ir is greater than the ideal luminance value (target luminance value), the variable-density correction amount C is calculated so as to increase the amount of ink to be ejected from that nozzle 211. The target luminance value as used herein refers to a luminance value when an image is captured at a prescribed target density of the apparatus, or an average or median value of the luminance values of all nozzles.

The correction amount calculation part 64 calculates the variable-density correction amount C for each density for each of the plurality of nozzles 211 included in the heads 21. Also, the correction amount calculation part 64 calculates the variable-density correction amount C in the same manner for each nozzle 211 of the four heads 21.

In the case of printing received data after the above-described shading correction, the controller 50 corrects the density values indicated by the data on the basis of the variable-density correction amounts C. Then, each nozzle 211 ejects ink droplets in accordance with the corrected density value. Accordingly, it is possible to obtain a high-quality print result with reduced inconsistencies in density caused by individual differences in the nozzles 211.

In this way, the inkjet printing apparatus 1 according to the present embodiment converts the plurality of captured images I1 to I5 into the one super-resolution image Ir with a high resolution. The apparatus then calculates the variable-density correction amount C for each nozzle 211 on the basis of the super-resolution image Ir. Accordingly, the variable-density correction amount C for each nozzle 211 can be calculated with high accuracy using the low-cost camera 31 with a lower resolution than the density of arrangement of the nozzles 211 in the sub-scanning direction.

3. Variations

While embodiments of the present invention has been described thus far, the present invention is not intended to be limited to the embodiments described above.

3-1. First Variation

Figure 9:
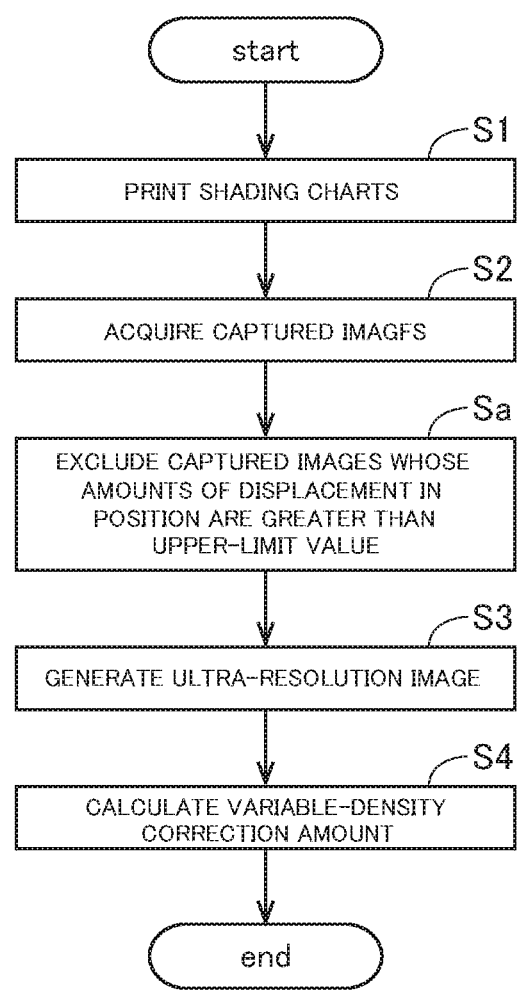
FIG. 9 is a flowchart illustrating a flow of shading correction according to a first variation.

FIG. 9 is a flowchart illustrating a flow of shading correction according to a first variation. The example in FIG. 9 differs from the above-described embodiments in that step Sa is performed between steps S2 and S3. In step S2, a plurality of captured image In and the amounts of displacement D in the position of the printing paper 9 in the main scanning direction, obtained when each captured image In is acquired, are acquired as in the above-described embodiment. Thereafter, in the example in FIG. 9, the acquired multiple displacement amounts D are compared with a preset upper-limit value in step Sa. Then, captured images In that are acquired when the displacement amounts D are greater than the upper-limit value are excluded. Accordingly, only captured images In acquired when the displacement amounts D are less than or equal to the upper-limit value are selected from among the plurality of captured images In. Then, the selected two or more captured images In are used to generate the super-resolution image Ir.

Captured images In acquired when the displacement amounts D are too large are difficult to contribute to improvements in resolution and are likely to become a cause of image noise. If step Sa is performed as in FIG. 9, it is possible to generate the super-resolution image Ir with higher accuracy while excluding captured images In whose displacement amounts D are inappropriate for ultra-resolution processing from the plurality of captured images In. Note that the aforementioned upper-limit value may, for example, be a length in the main scanning direction corresponding to one pixel of the camera 31.

3-2. Second Variation

Figure 10:
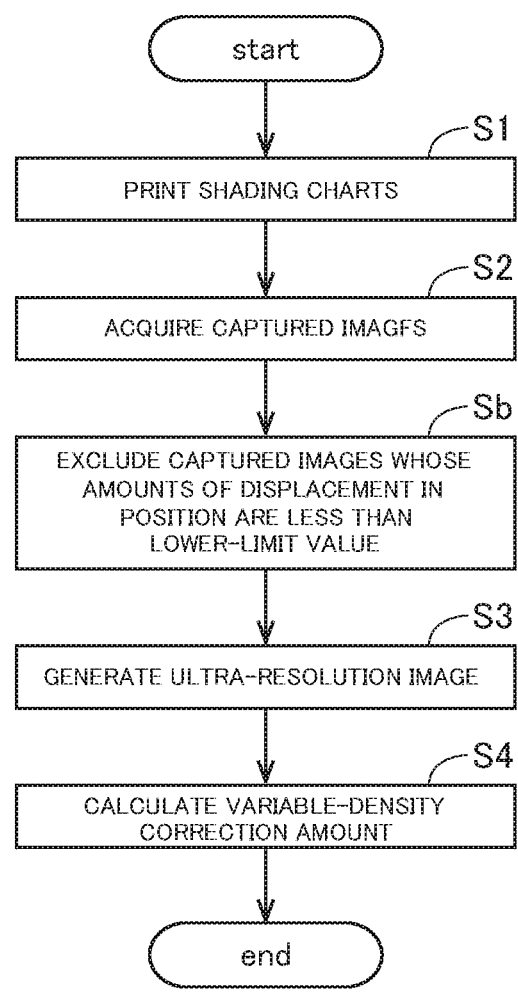
FIG. 10 is a flowchart illustrating a flow of shading correction according to a second variation.

FIG. 10 is a flowchart illustrating a flow of shading correction according to a second variation. The example in FIG. 10 differs from the above-described embodiments in that step Sb is performed between steps S2 and S3. In step S2, a plurality of captured images In and the amounts of displacement D in the position of the printing paper 9 in the main scanning direction, obtained when each captured image In is captured, are acquired as in the above-described embodiments. Thereafter, in the example in FIG. 10, the acquired multiple displacement amounts D are compared with a preset lower-limit value in step Sb. Then, captured images In that are acquired when the displacement amounts D are less than the lower-limit value are excluded. Accordingly, only captured images In acquired when the displacement amounts D are greater than or equal to the lower-limit value are selected from among the plurality of captured images In. Then, the selected two or more captured images In are used to generate the super-resolution image Ir.

Captured images In acquired when the displacement amounts D are too small are also difficult to contribute to improvements in resolution. If step Sb is performed as in FIG. 10, it is possible to generate the super-resolution image Ir while excluding captured images In whose displacement amounts D are inappropriate for ultra-resolution processing from the plurality of captured images In, and arithmetic processing loads on the controller 50 can be reduced. Note that the aforementioned lower-limit value may, for example, be a length in the main scanning direction corresponding to one pixel of the heads 21.

3-3. Third Variation

In the above-described embodiments, the super-resolution image Ir is generated using the five captured images I1 to I5. However, the number of captured images In that are used to generate the super-resolution image Ir may be in the range of two to four, or may be six or more. Also, the ultra-resolution processing part 63 may change the number of captured images In that are used to generate the super-resolution image Ir according to preset conditions. For example, the number of captured images In that are used to generate the super-resolution image Ir may be changed according to the type of the printing paper 9. This enables the super-resolution image Ir to be generated using an appropriate number of captured images In according to the type of the printing paper 9, even if the likelihood of occurrence of displacement in position in the main scanning direction varies according to the type of the printing paper 9.

3-4. Fourth Variation

The inkjet printing apparatus 1 according to the above-described embodiments separately includes the camera 31 forming the image capturing part 30, and the edge sensor 41 forming the detector 40. However, one camera 31 may have both of the function of the image capturing part 30 and the function of the detector 40. That is, images captured by the camera 31 may be used as a basis to detect the amounts of displacement D in the position of the printing paper 9 in the width direction. Since the position of the printing paper 9 in the main scanning direction is assumed to change continuously, positions can be predicted with accuracy higher than the resolution of the camera, by using methods such as acquiring the image capturing position from the results of calculation of the positions before and after image capture. This eliminates the need to prepare separate devices for the image capturing part 30 and the detector 40. Accordingly, the number of components of the inkjet printing apparatus can be reduced.

3-5. Other Variations

In the above-described embodiments, the image recording part 20 includes the four heads 21. However, the number of heads 21 included in the image recording part 20 may be in the range of one to three or may be five or more. For example, the image recording part 20 may be provided with a head for ejecting ink of a special color, in addition to the colors including C, M, Y, and K.

In the above-described embodiments, printing is performed on the long band-like continuous printing paper 9. However, the inkjet printing apparatus according to the present invention may perform printing on each piece of printing paper while sequentially transporting a plurality of pieces of printing paper in the sub-scanning direction. In that case, a displacement in position in the main scanning direction is unlikely to occur in a single piece of printing paper 9, but a displacement in position in the main scanning direction is likely to occur among a plurality of pieces of printing paper 9. Thus, the super-resolution image Ir may be generated using a plurality of captured images In acquired for different pieces of printing paper 9.

Also, the inkjet printing apparatus 1 described above records images on the printing paper 9 serving as a recording medium. However, the inkjet printing apparatus according to the present invention may record images on recording media (e.g., resin film) other than ordinary paper.

The detailed structure of the inkjet printing apparatus may differ from the structures illustrated in the drawings of the present specification. Also, each component described in the embodiments and variations described above may appropriately be combined within a range that presents no contradictions.

While the invention has been shown and described in detail, the foregoing description is in all aspects illustrative and not restrictive. It is therefore to be understood that numerous modifications and variations can be devised without departing from the scope of the invention.

What is claimed is:

1. An inkjet printing apparatus for printing an image on a surface of a recording medium, comprising:
    a head having a plurality of nozzles arranged in a main scanning direction, said plurality of nozzles ejecting ink to a surface of a recording medium;
    a transport mechanism that transports a recording medium relative to said head in a sub-scanning direction orthogonal to said main scanning direction;
    an image capturing part that captures an image of a surface of a recording medium at an image capturing position located downstream of said head in said sub-scanning direction;
    a detector that detects an amount of displacement in position of a recording medium in said main scanning direction at said image capturing position; and
    a controller connected to said head, said transport mechanism, said image capturing part, and said detector,
    said controller including:
    a chart print instruction part that controls and causes said head and said transport mechanism to print a shading chart whose density changes in a stepwise fashion in said sub-scanning direction on a recording medium;
    an image acquisition part that controls and causes said image capturing part to acquire a plurality of captured images for a region of the same density of said shading chart;
    an ultra-resolution processing part that generates one super-resolution image with a higher resolution than said plurality of captured images on the basis of said plurality of captured images acquired by said image capturing part, and amounts of displacement in position of a recording medium in said main scanning direction acquired by said detector; and
    a correction amount calculation part that calculates a variable-density correction amount for each of said plurality of nozzles on the basis of said ultra-resolution image.

2. The inkjet printing apparatus according to claim 1, wherein
    said ultra-resolution processing part generates said super-resolution image by compositing said plurality of captured images acquired by said image capturing part while shifting said plurality of captured images in said main scanning direction in accordance with said amounts of displacement.

3. The inkjet printing apparatus according to claim 2, wherein
    said ultra-resolution processing part generates said super-resolution image by obtaining an average value of luminance values in said plurality of captured images for each pixel.

4. The inkjet printing apparatus according to claim 1, wherein
    said ultra-resolution processing part generates said super-resolution image by using, among said plurality of captured images, two or more captured images that are acquired when said amounts of displacement acquired by said detector are less than or equal to a preset upper-limit value.

5. The inkjet printing apparatus according to claim 1, wherein
    said ultra-resolution processing part generates said super-resolution image by using, among said plurality of captured images, two or more captured images that are acquired when said amounts of displacement acquired by said detector are greater than or equal to a preset lower-limit value.

6. The inkjet printing apparatus according to claim 1, wherein
    said ultra-resolution processing part changes the number of said captured images that are used to generate said super-resolution image, according to a preset condition.

7. The inkjet printing apparatus according to claim 1, comprising:
one camera that has both a function of said image capturing part and a function of said detector.

8. The inkjet printing apparatus according to claim 1, wherein
said transport mechanism transports a long band-like recording medium from an unwinder toward a winder in said sub-scanning direction that is a longitudinal direction of said recording medium.

9. A variable-density correction method for an inkjet printing apparatus for printing an image on a surface of a recording medium by ejecting ink from a plurality of nozzles of a head arranged in a main scanning direction while transporting said recording medium relative to said head in a sub-scanning direction orthogonal to said main scanning direction,
the variable-density correction method comprising:
a) printing a shading chart whose density changes in a stepwise fashion in said sub-scanning direction, on a surface of a recording medium;
b) acquiring a plurality of captured images for a region of the same density of said shading chart printed on a recording medium while detecting amounts of displacement in position of said recording medium in said main scanning direction;
c) generating one super-resolution image with a higher resolution than said plurality of captured images acquired in said operation b), on the basis of said plurality of captured images and amounts of displacement in position of said recording medium in said main scanning direction; and
d) calculating a variable-density correction amount for each of said plurality of nozzles on the basis of said super-resolution image.

10. The variable-density correction method according to claim 9, wherein
in said operation c), said super-resolution image is generated by compositing said plurality of captured images while shifting said plurality of captured images in said main scanning direction in accordance with said amounts of displacement.

11. The variable-density correction method according to claim 10, wherein
in said operation c), said super-resolution image is generated by obtaining an average value of luminance values in said plurality of captured images for each pixel.

12. The variable-density correction method according to claim 9, wherein
in said operation c), said super-resolution image is generated by using, among said plurality of captured images, two or more captured images that are acquired when said amounts of displacement acquired in said operation b) are less than or equal to a preset upper-limit value.

13. The variable-density correction method according to claim 9, wherein
in said operation c), said super-resolution image is generated by using, among said plurality of captured images, two or more captured images that are acquired when said amounts of displacement acquired in said operation b) are greater than or equal to a preset lower-limit value.

* * * * *